Dec. 16, 1952    J. R. SCHUYLER    2,621,359
HINGE CONSTRUCTION
Filed Sept. 15, 1945

INVENTOR
JOE R. SCHUYLER
ATTORNEY

Patented Dec. 16, 1952

2,621,359

UNITED STATES PATENT OFFICE 2,621,359

HINGE CONSTRUCTION

Joe R. Schuyler, Middletown, Ohio, assignor to Curtiss-Wright Corporation, a corporation of Delaware Application September 15, 1945, Serial No. 616,553

6 Claims. (Cl. 16—144)

This invention pertains to hinges generally and to an improved and novel arrangement of parts for a hinge structure.

In modern aircraft structures, it is often necessary to provide access openings to various parts of the structure, these access openings normally being closed by doors. Of particular importance, because of their size and weight, are doors for openings for the entrance of passengers and other personnel and for openings for cargo loading. In order to secure the best aerodynamic characteristics of the aircraft, it is desired that such doors lie flush with the body of the aircraft when in closed position, without parts thereof projecting from the surface. For this purpose, ordinary hinge structures will not suffice, since the joint line or surface between the aircraft body and the door is usually highly curved.

It is therefore an object of this invention to provide an improved hinge structure for doors and the like. It is another object to provide such a hinge structure particularly adapted for a door which must lie flush, when closed, with the body to which it is attached. A further object is to provide such a hinge structure in which the joint line or surface between door and body is highly curved. A still further object is to provide such a hinge structure which will allow outward swinging of the door to a back-to-back position with respect to the body to which it is attached, without interference with the adjoining edges or surfaces of such body. Other objects will appear hereinafter.

Figure 1:
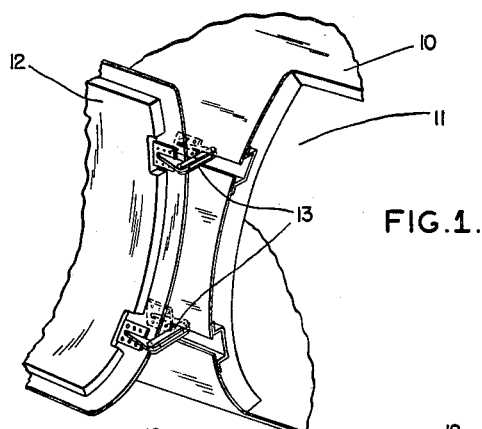
Figure 2:
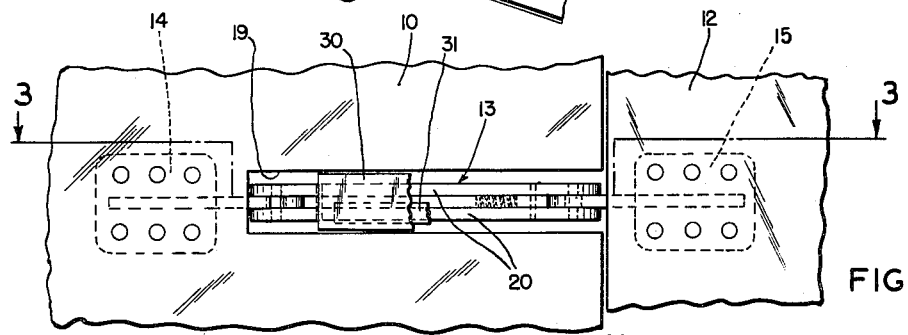
Figure 3:
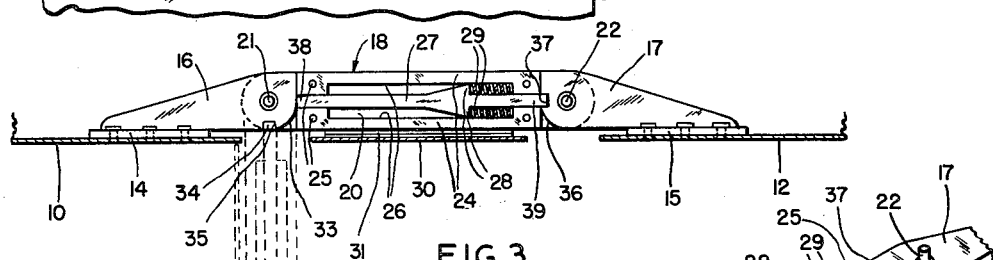
Figure 4:
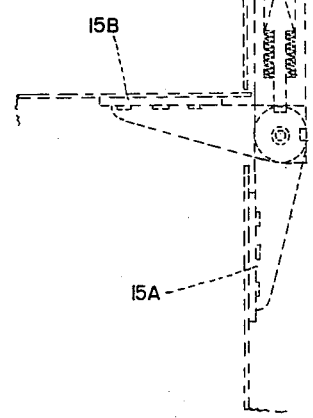

These objects are accomplished by the herein described invention, which may be more readily understood by reference to the accompanying drawings, in which: Figure 1 is a fragmentary perspective view of a typical hinge and door installation for aircraft with the door shown in fully open position and in back-to-back position relative to the fuselage; Figure 2 is an enlarged front elevation, with parts broken away for convenience in illustration, of one of the hinge structures shown in Figure 1 in fully closed position, with the adjacent portions of its associated door and fuselage; Figure 3 is a view taken along the line 3—3 of Figure 2; and Figure 4 is a perspective view of parts of the hinge structure shown in Figures 2 and 3.

In the drawings, the aircraft fuselage 10 is provided with an access aperture 11 and a closure door 12. A pair of identical hinges 13 support the door for pivoting movement so that the door and fuselage may take the relative position shown in Figure 1 without interference therebetween. Each hinge has rigidly secured to the fuselage a leaf member 14 and to the door a leaf member 15. These leaves 14 and 15 have upstanding portions 16 and 17 respectively for the support and pivotal carriage of a link 18 to be described presently. Recesses 19 are formed in the fuselage for the reception of the hinge structure when the door is in closed position, thus resulting in a clean, unobstructed exterior surface in the zone of the hinges. The link 18 includes a pair of body plates 20 pivotally connected at the leaf portion 16 by a hinge pin 21 and similarly pivotally connected at leaf portion 17 by a second hinge pin 22. The upper hinge plate 20 has been removed from Figure 4 for convenience in viewing other parts of the structure. The two body plates 20 carry between them a pair of spacer elements 24 attached thereto by means of pins 25. The spacer elements 24 are provided with opposed and inwardly facing recesses 26, the spacers further being laterally separated at each end thereof so that a hinge locking pin or detent 27 positioned in the space between them may have a certain degree of sliding movement during the hinge folding action. The detent 27 has formed thereon laterally extending shouldered projections 28 for the abutment of a pair of coil spring elements 29, the latter elements acting against the fixed end wall of recesses 26 in a manner urging the detent 27 toward the hinge pivot 21.

To one of the plates 20 is attached a cover plate or skirt 30 by means of an angle bracket 31, as shown particularly in Figure 2. This serves to cover the major portion of the hinge structure when in closed position, thereby improving the appearance and aerodynamic characteristics thereof.

On the leaf portion 16 there is formed an arcuate surface 33 together with a detent receiving recess 34 positioned at an angle to the longitudinal axis of detent member 27 when the hinge is in its closed position (full lines in Figure 3). The recess 34 also includes a sloping surface 35, the purpose of which will be noted presently. As will be seen hereinafter, the surface 33, recess 34 and sloping surface 35 act as a cam on detent 27. The door hinge leaf portion 17 also is provided with an arcuate edge formation 36 together with a recess formation 37 located in axial alignment with the hinge detent axis when the hinge is closed (full lines in Figure 3). Thus the detent 27 is normally urged against the spring elements 29 by the abutment of detent end portion 38 on the edge portion of element 16 which is tangent to the arcuate edge 33. The effect of this is to position detent end portion 39 in the recess 37 when the hinge is in closed position (Figure 4 and full lines in Figure 3).

In operation, the first action of the hinge 13 upon opening of the door 12 is to pivot about the pin 21 at the fuselage supported lead 14, since the pivotal arrangement at pivot pin 22 is locked against displacement by meshing of detent finger 39 in recess 37. Thus door 12 is forced to move away from the fuselage through the action of link 18. The door may pivot in this manner until the detent finger 38 rides into the recess 34 under the influence of spring means 29 (open position of link 18 with respect to leaf 14). At this point the engagement of detent 27 in recess 34 and the abutment of the end of spacers 24 against leaf portion 16 prevents further angular travel of means 18. At the same time, the entrance of detent portion 38 into recess 34 secures the withdrawal of detent portion 39 from recess 37. This allows further angular movement of bracket 15 from the dotted line position indicated at 15A (closed position) to the dotted line position indicated at 15B (open position).

When closing the door, the reverse operation takes place. The first action is to swing the door about pivot 22 and into its half open position or dotted line position 15A of Figure 3 (closed position of leaf 15 with respect to link 18, open position of link 18 with respect to leaf 14), thus making it possible for detent finger portion 39 to move into the notch 37 when urged to do so against springs 29. Further closing movement of the door causes the same to pivot now about the pin 21 and during the first portion of this swinging displacement detent finger portion 38 will contact cam face 35 and be forced outwardly until it rides on arcuate face 33. The axial displacement of detent 27 caused by cam face 35 on leaf member 16 drives finger 39 into recess 37 and this serves to lock the door leaf 15 with link 18 so that no further rotation about pivot pin 22 can occur.

Obviously there are certain modifications or alterations which will occur or be suggested by the description given in connection with a preferred form of the present hinge structure. It is understood that the invention is not to be limited thereto except as defined by the appended claims.

I claim:

1. A hinge comprising two leaves respectively pivoted to opposite end portions of a connecting link, latch means for holding one leaf against pivotal movement relative to the link, said latch means including a latch detent movably supported by said link, and means on the other leaf for cooperating with said latch detent for maintaining the latch means operative in predetermined positions of said link relative to said other leaf, and for rendering the latch means releasable in another predetermined position of the link relative to said other leaf.

2. A hinge comprising two leaves respectively pivoted to opposite end portions of a connecting link, latch means for holding one leaf against pivotal movement relative to the link, said latch means including a latch detent movably supported by said link, resilient means for urging said detent to a position wherein said latch means is released, and means on the other leaf for holding said detent against release in predetermined positions of the link relative to said other leaf and for enabling such release in another predetermined position of the link relative to said other leaf.

3. A hinge comprising two leaves respectively pivoted to opposite end portions of a connecting link, latch means for holding one leaf against pivotal movement relative to the link, said latch means comprising a latch detent movably supported by said link, resilient means for urging said detent to unlatching position, the other leaf having a cam surface engaging said detent for holding it against unlatching movement in predetermined positions of the link relative to said other leaf and for enabling it to move to said unlatching position in another predetermined position of the link relative to said other leaf.

4. A hinge comprising two leaves respectively pivoted to opposite end portions of a connecting link, each leaf having a curved surface portion concentric with its pivot to the link and having a recess contiguous to said surface portion, and a detent movably mounted on the link, each of the opposite ends of the detent being adapted to contact one of said curved surface portions and to enter into the contiguous recess, the detent being so proportioned that when one end thereof is in contact with the curved surface portion of one leaf the opposite end thereof is held against retraction from the recess in the other leaf.

5. A hinge comprising two leaves respectively pivoted to opposite end portions of a connecting link; a latch detent supported on the link for sliding movement along the link; one of said leaves having a detent-engaging portion, said detent and detent-engaging portion serving, when engaged, to hold said one leaf against pivotal movement relative to the link; spring means acting between the link and the detent for urging the latter from engagement with said detent-engaging portion; the other leaf having a surface substantially concentric with the axis of its pivot to the link and having a recess adjacent to one end of said concentric surface, said concentric surface interacting with the detent to hold it from disengaging sliding movement in predetermined positions of the link relative to the other leaf and said recess allowing such sliding movement in another predetermined position of the link relative to the other leaf.

6. A hinge comprising a wall bracket, a door plate, a link pivoted at one end to the bracket and at the other to said door plate, a latch mounted for endwise movement within said link and operable in one extreme position to lock the door plate against turning movement with respect to the link and the other extreme position to lock the link against turning movement with respect to the bracket, and means for automatically shifting said latch from one locking position to the other during swinging movements of said link.

JOE R. SCHUYLER.

REFERENCES CITED

The following references are of record in the file of this patent:

UNITED STATES PATENTS

| Number | Name | Date |
| --- | --- | --- |
| 990,552 | Hassmann | Apr. 25, 1911 |
| 1,844,978 | Renaud | Feb. 16, 1932 |
| 2,494,682 | Aspin | Jan. 17, 1950 |

FOREIGN PATENTS

| Number | Country | Date |
| --- | --- | --- |
| 413,393 | Great Britain | July 19, 1934 |
| 431,226 | Great Britain | July 3, 1935 |